United States Patent [19]

Ledebuhr

[11] Patent Number: 4,749,259

[45] Date of Patent: Jun. 7, 1988

[54] LIQUID CRYSTAL IMAGE PROJECTION WITH MULTICOLOR PREPOLARIZING SYSTEM

[75] Inventor: Arno G. Ledebuhr, Pleasanton, Calif.

[73] Assignee: Hughes Aircraft Company, Los Angeles, Calif.

[21] Appl. No.: 13,479

[22] Filed: May 15, 1987

[51] Int. Cl.[4] .................. G02F 1/13; G02B 27/28; G03B 21/26

[52] U.S. Cl. .................. 350/337; 350/402; 353/33

[58] Field of Search .............. 350/331 R, 337, 342, 350/403, 401, 402, 408, 173, 174; 358/225, 226, 232, 237; 353/31, 33, 37, 20

[56] References Cited

U.S. PATENT DOCUMENTS

| | | | |
|---|---|---|---|
| 2,403,731 | 4/1943 | Macneille | 350/173 |
| 3,501,640 | 3/1970 | Harris | 350/403 |
| 3,925,813 | 12/1975 | Toyama et al. | 350/173 X |
| 4,127,322 | 11/1978 | Jacobson et al. | 353/31 |
| 4,191,456 | 3/1980 | Hong et al. | 350/342 X |
| 4,422,722 | 12/1983 | Higuchi et al. | 350/173 |
| 4,464,018 | 8/1984 | Gagnon | 350/342 |
| 4,464,019 | 8/1984 | Gagnon | 350/331 R X |
| 4,500,172 | 2/1985 | Gagnon et al. | 350/337 X |

FOREIGN PATENT DOCUMENTS 2163865  3/1986  United Kingdom ............. 350/173

Primary Examiner—Stanley D. Miller
Assistant Examiner—David Lewis
Attorney, Agent, or Firm—A. W. Karambelas

[57] ABSTRACT

An optical system for a full color liquid crystal light valve image projector is provided. The invention includes a first prepolarizer for separating from a first beam light of first and second colors and a first polarization state and a second prepolarizer for separating from the first beam light of a third color and a second polarization state. The resultant first beam contains light of a third color and first polarization state and light of first and second colors and second polarization state. A polarization selective beamsplitter is provided in the optical path of the first beam for transmitting, in a second beam, light in the first beam having the first polarization state and reflecting, in a third beam, light in the first beam having the second polarization state. A color selective beamsplitter is included for transmitting, in a fourth beam, light in the third beam having a first color and for reflecting, in a fifth beam, light in the third beam having a second color. In the illustrative embodiments, the invention includes first and second reflective surfaces for reflecting the second and fifth beams respectively into a parallel coplanar relation with the fourth beam. The invention permits the light valves and associated CRT assemblies to be located in a parallel coplanar relation. The present invention thereby provides a compact design for a liquid crystal light valve image projection systems.

10 Claims, 5 Drawing Sheets

GREEN PREPOLARIZER

RED-BLUE PREPOLARIZER

BROADBAND POLARIZER / ANALYZER

RED-BLUE COLOR SEPARATOR

LIQUID CRYSTAL IMAGE PROJECTION WITH MULTICOLOR PREPOLARIZING SYSTEM

BACKGROUND OF THE INVENTION

1. Field of the Invention

The present invention relates to image projection systems. More specifically, the present invention relates to liquid crystal light valve image projection systems.

While the present invention is described herein with reference to illustrative embodiments for a particular application, the invention is not limited thereto. Those of ordinary skill in the art and access to the teachings provided herein will recognize additional modifications, applications and embodiments within the scope thereof.

2. Description of the Related Art

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube (CRT) is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirrors is polarization-modulated in according with the information incident on the photoconductor. Therefore, when a complex distribution of light, for example, a high resolution input image, is focused onto the photoconductor surface, the device converts the image into a replica which can be projected with magnification to produce a high brightness image on a viewing screen. U.S. Pat. No. 4,019,807, issued to D. D. Boswell et al on Apr. 26, 1977, disclosed such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 *Society for Information Display* (SID), International Symposium, Digest of Technical Papers, May 1979, pp. 22-23.

More sophisticated liquid crystal light valve image projection systems are illustrated in the following patents: U.S. Pat. No. 4,425,028, issued to R. J. Gagnon et al on Jan. 10, 1984; U.S. Pat. No. 4,461,542, to R. J. Gagnon on July 24, 1984; and U.S. Pat. No. 4,464,019, issued to R. J. Gagnon on Aug. 7, 1984.

These designs provide high resolution, high contrast full color images by separating an input beam into different optical paths for polarization and/or color processing. The beams are then recombined at or prior to illumination of a main polarizing prism.

These designs also illustrate the continuing effort in the art to provide high performance, low cost image projection with a compact assembly. For example, while the system of U.S. Pat. No. 4,461,542 provides a less bulky, more compact design than that of U.S. Pat. No. 4,464,019, it requires two projection lenses to output the display information. And while the system of U.S. Pat. No. 4,425,028 provides a compact design requiring a single projection lense, it has been recognized that the packagability of the system could be improved further by locating the light valve CRT assemblies in a parallel coplanar relation. Thus, a need remains in the art for a compact full color high performance liquid crystal light valve image projection system.

SUMMARY OF THE INVENTION

The need in the art for a compact full color, high performance liquid crystal light valve image projection system is addressed by the optical system of the present invention. In an illustrative embodiment, the invention includes a first prepolarizer for separating from a first beam light of first and second colors and a first polarization state and a second prepolarizer for separating from the first beam light of a third color and a second polarization state. The resultant first beam contains light of a third color and first polarization state and light of first and second colors and second polarization state. A polarization selective beamsplitter is provided in the optical path of the first beam for transmitting, in a second beam, light in the first beam having the first polarization state and reflecting, in a third beam, light in the first beam having the second polarization state. A color selective beamsplitter is included for transmitting, in a fourth beam, light in the third beam having a first color and for reflecting, in a fifth beam, light in the third beam having a second color. In the illustrative embodiments, the invention includes first and second reflective surfaces for reflecting the second and fifth beams respectively into a parallel coplanar relation with the fourth beam.

The invention permits the light valves and associated CRT assemblies to be located in a parallel coplanar relation. The present invention thereby provides a compact design for a liquid crystal light valve image projection systems.

Further, by using a dual color/polarization approach, the present invention appears to offer improvements in performance and efficiency relative to the single color/polarization approaches of the related art.

DESCRIPTION OF THE INVENTION

The present invention provides a compact immersed optical system for a full color liquid crystal light valve image projector. As discussed more fully below, in one illustrative embodiment, first and second crossed color prepolarizing beamsplitters are used to filter out red and blue wavelengths of one polarization state and green wavelengths of the opposite polarization state from an unpolarized white light source. A polarization selective beamsplitter is then used to separate the green wavelengths from the red and blue wavelengths based on the polarizations thereof. Next, a color selective beamsplitter separates the red and blue wavelengths. Finally, fold mirrors are used to make the optical axes of the three channels parallel and coplanar. This permits the light valves to be mounted in close parallel coplanar relation thus providing a compact projector design. The assembly provides the primary colors that illuminate the light valves in a conventional manner. Three beams of polarization modulated light are returned by the light valves along their respective optical paths to the polarization selective beamsplitter for recombination into a single output beam. The output beam is directed out of the fluid filled tank through projection optics and onto a suitable display screen. By combining the three primary beams into a single output beam, only a single projection lens or projection-relay lens is required. Further, the dual color/polarization approach of the present invention appears to offer improvements in performance and efficiency relative to the single color/polarization approaches of the related art.

Figure 1:
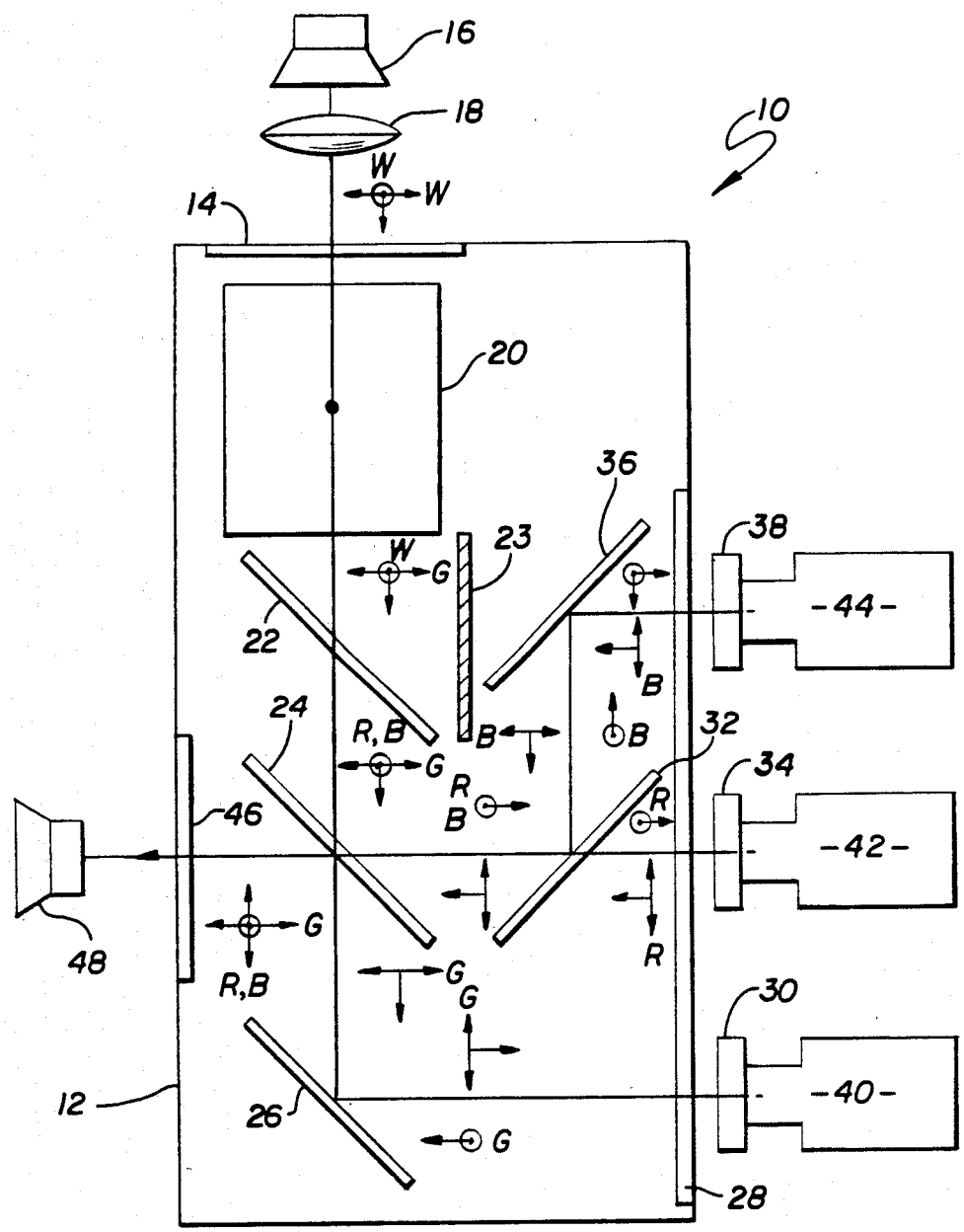
FIG. 1 is a top schematic view of a first illustrative embodiment of the liquid crystal light valve image projection system of the present invention.
Figure 5:
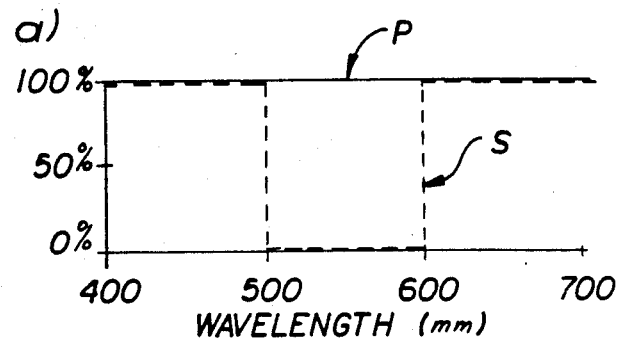
FIG. 5 shows idealized transmission curves for the filters of the present invention.
Figure 5:
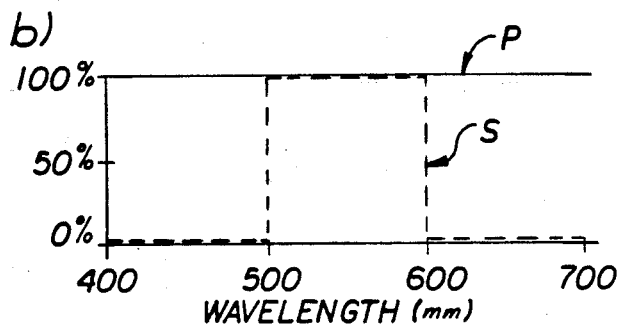
Figure 5:
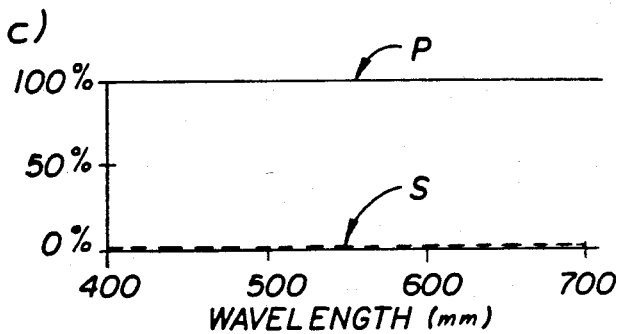
Figure 5:
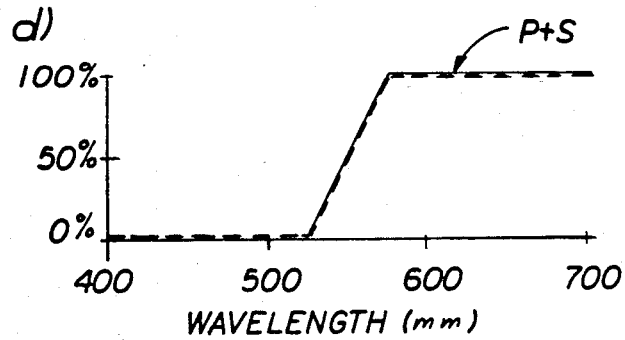

FIG. 1 is a top view of a schematic diagram of a first illustrative embodiment of the full color liquid crystal light valve image projection system of the present invention. For the purpose of illustration, all filter elements are oriented at 45 degrees to the optical axis of the system. In practice, some of the angles of orientation may increase for some of the components. The image projection system 10 includes an optical tank 12 within which optical elements described below are immersed in optical grade oil (not shown). The oil is of an index of refraction which matches that of optical elements of the system. The oil may be replaced with glass or other suitably transparent material as is known in the art. The tank 12 has an input aperture or window 14 on which an ultraviolet (UV) filter may be coated. The ultraviolet filter protects the oil and light valves from ultraviolet light. An incident beam of input illumination is provided through the aperture 14 by a high intensity light source (typically an arc lamp) 16 through a collimating lens 18. A first color selective prepolarizer 20 is mounted in the tank 12 in optical alignment with the source lamp 16 for separating from the incident beam light of a first color (red) and of a second color (blue) having a first polarization state (S). That is, the first prepolarizer 20 reflects red and blue S polarized light while transmitting green S polarized light and white P polarized light. There are at least two approaches to the design of the red and blue prepolarizer 20. The preferred approach is to manufacture the complete filter 20 in a single multi-layer stack, for which a typical transmission curve is shown in FIG. 5(b). A second approach would be to use two separate filters, a polarizing short pass red reflector and a polarizing long pass blue reflector. These polarizing short and long pass filter designs are well known in the art as are the designs for the remaining elements in the optical system. The remaining optical elements of the system are arranged at a 90 degree angle with respect to the first color selective prepolarizer 20. A second color selective prepolarizer 22 is mounted in the optical path of beam prepolarized by the first prepolarizer 20. The second prepolarizer 22 is a green prepolarizer which reflects the green S polarized light and transmits the red and blue S polarized light and the white P polarized light. Since the green prepolarizer 22 is oriented at 90 degrees with respect to the red and blue prepolarizer 20, light that is S polarized with respect to the red and blue prepolarizer 20 will be P polarized with respect to the green prepolarized 22. Similarly, light which is P polarized with respect to the red and blue prepolarized 20 is S polarized with respect to the green prepolarizer 22. Thus, the green component of the white P polarized light transmitted by the red and blue prepolarizer 20 is reflected as green S polarized light by the green prepolarizer 22. Similarly, the green S polarized light, transmitted by the red and blue prepolarizer 20 is transmitted unchanged as green P polarized light by the green prepolarizer 22. Thus, what remains of the input light following these two prepolarizing prisms 20 and 22 is red and blue light whose polarization axes are perpendicular to the plane of the page (and S polarized with respect to the remaining elements) and a green component polarized parallel to the plane of the page (and P polarized relative to the remaining filter elements). The prepolarizers 20 and 22 are constructed of glass or other suitably transparent material and coated with an optical thin film coating typically having numerous sets of layers of a predetermined optical thickness for optimum performance in oil of a particular index of refraction and for light at a particular angle of incidence. As mentioned above, the design of such elements is known in the art and the invention is not limited thereto. By way of example, the design of filter elements are provided more fully in the teachings of the above noted patents which are incorporated by reference herein.

A light block 23 is provided to shield the system from the light discarded by the green prepolarizer 22. The green P polarized light is transmitted as a second beam and the red and blue polarized light is reflected as a third beam by a polarization selective beamsplitter 24. The polarization selective beamsplitter 24 serves as a main prism or polarizer/analyzer and provides the dual function of separating the beam into two beams for illuminating the light valves, then subsequently, recombining the beams which are returned by the light valves as polarization modulated light. The green P polarized light in the second beam is transmitted to a fold mirror 26. The green wavelengths are now perpendicular to the optical input axis. The green P polarized light exits a common tank window 28 and illuminates a green light valve 30. The red and blue S polarized light is reflected by the polarization selective beamsplitter 24 as a third beam to a color selective filter/beamsplitter 32. The color selective filter 32 transmits the red wavelengths, as a fourth beam, and reflects the blue wavelengths as a fifth beam. The red S polarized fourth beam exits the tank 12 through the common window 28 and illuminates the red light valve 34. The blue S polarized fifth beam is reflected by a second fold mirror 36 through the common window 28 to a blue light valve 38. As shown in FIG. 1, the first and second fold mirrors 26 and 36 deflect the second and fifth beams into parallel coplanar relation with the fourth beam. This permits the light valve and associated CRT assemblies to be mounted in parallel in the same plane, which in turn, affords a more compact easily produced design. The green, red and blue light valves 28, 34 and 38 respectively, modulate the polarization state of the illumination beams in accordance with the presence of input images from the CRTs 40, 42 and 44 respectively, in a manner well known in the art. The polarization modulated beams are reflected by the light valves and retrace their paths to the polarization selective beamsplitter 24 for recombination.

That is, the light returned by the green light valve 30 is S polarized. As such, it is now reflected by the main beamsplitter 24. Similarly, light returned by the red and blue light valves 34 and 38 is P polarized. This light passes through the main beamsplitter 24 and thereby is recombined with the reflected green S polarized light. The combined beams are directed through an output window 46 to projection optics 48 for display.

Figure 2:
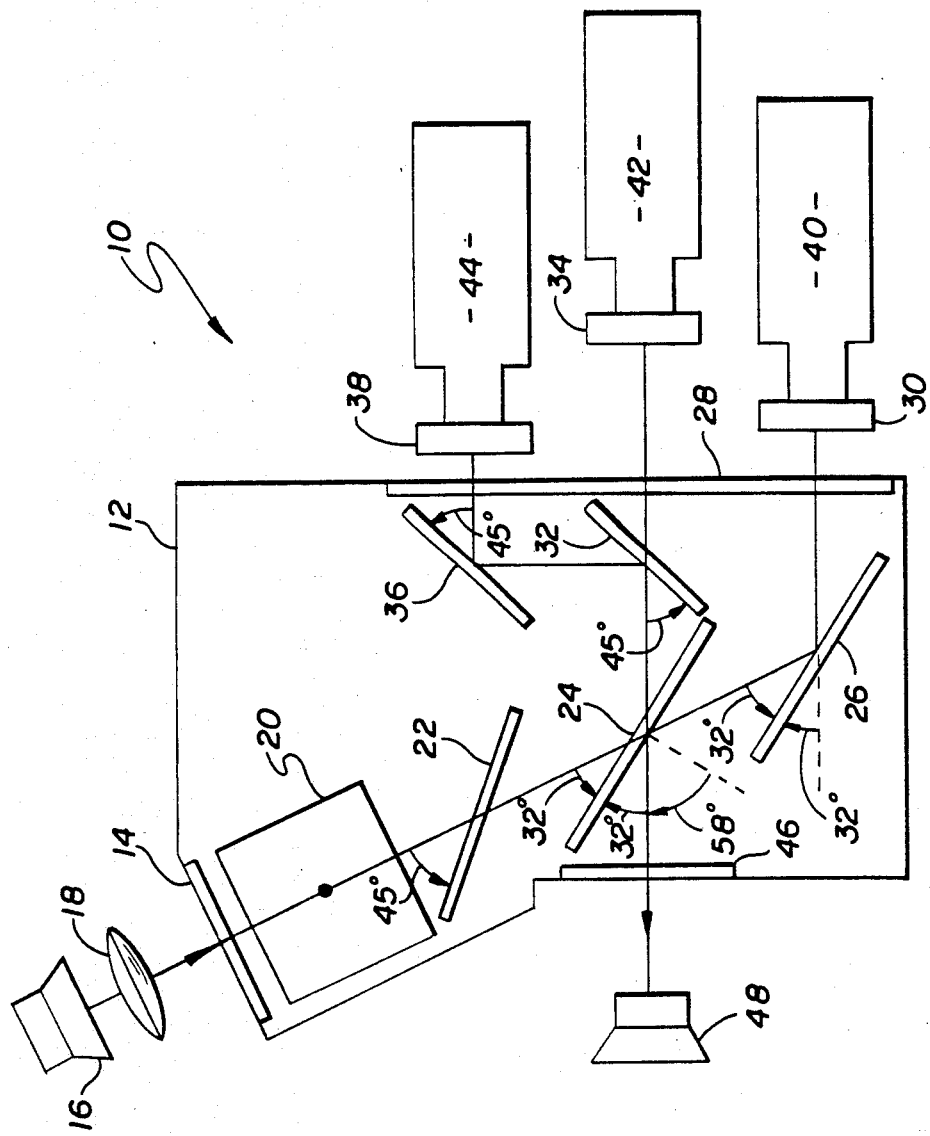
FIG. 2 is an alternative configuration of the first illustrative embodiment of the liquid crystal light valve image projection system of the present invention.

FIG. 2 shows an alternative configuration for the illustrative embodiment of FIG. 1. The mounting of the input window 14, red and blue prepolarizer 20, and green prepolarizer 22 is rotated counterclockwise relative to the main beamsplitter 24 and the green fold mirror 26. While the incident angle for the green prepolarizer 22 is not changed in this configuration, the incident angles for the main beamsplitter 24 and the green fold mirror 26 increase. In the configuration of FIG. 2, the beamsplitter 24 and the green fold mirror 26 are mounted at 32 degrees relative to the horizontal. The increase in the design angle for the main beamsplitter 24 affords an increase in the contrast ratio for the system 10. This is due to the fact that the current state of the art in the design of polarizers is such that it is easier to design a high extinction ratio polarizer at larger angles of incidence. The configuration of FIG. 2 also illustrates that the invention is not limited to any particular orientation of the filter elements.

Figure 3:
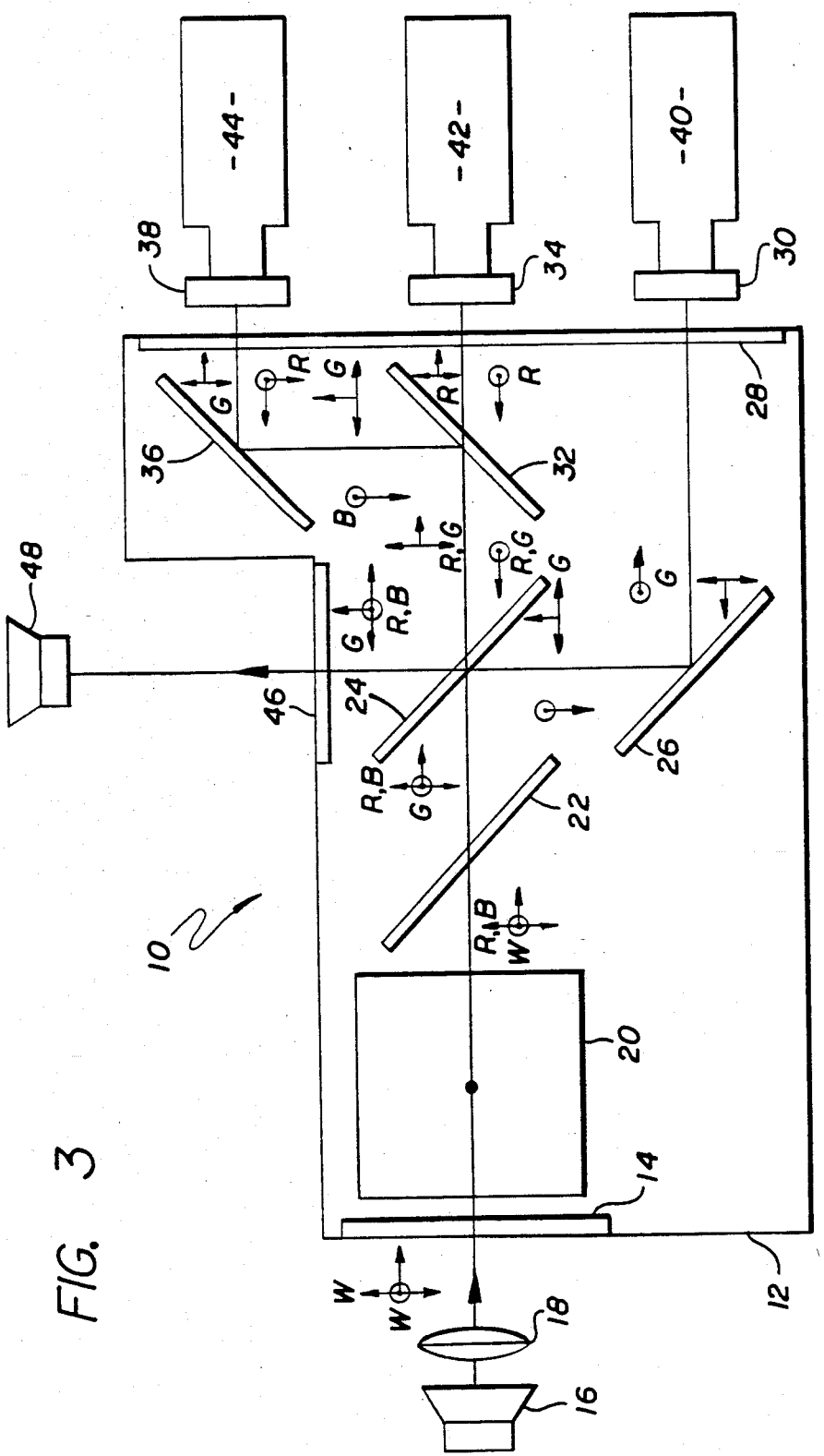
FIG. 3 is a top schematic view of a second illustrative embodiment of the liquid crystal light valve image projection system of the present invention.

FIG. 3 shows an alternative embodiment in which the location and orientation of the red and blue prepolarizer 20 and the green prepolarizer 22 are interchanged relative to the main beamsplitter 24. The green light illuminates the main beamsplitter 24 as S polarized light and the red and blue light are provided as P polarized light. Thus, the green component is reflected by the main beamsplitter 24 to the green fold mirror 26 while the red and blue components are now transmitted by the main beamsplitter 24. This embodiment offers a package size/performance tradeoff. That is, since the green prepolarizer 22 is now oriented at 90 degrees with respect to the main beamsplitter 24, the contrast of the green channel should be improved. This may be important since the eye is believed to be most sensitive to the green wavelengths. However, the embodiment of FIG. 3 causes an increase in the total length of the optical path along the axes of the light valves and associated CRT assemblies. This embodiment may therefore be preferred where the packaging requirements are less stringent.

Figure 4:
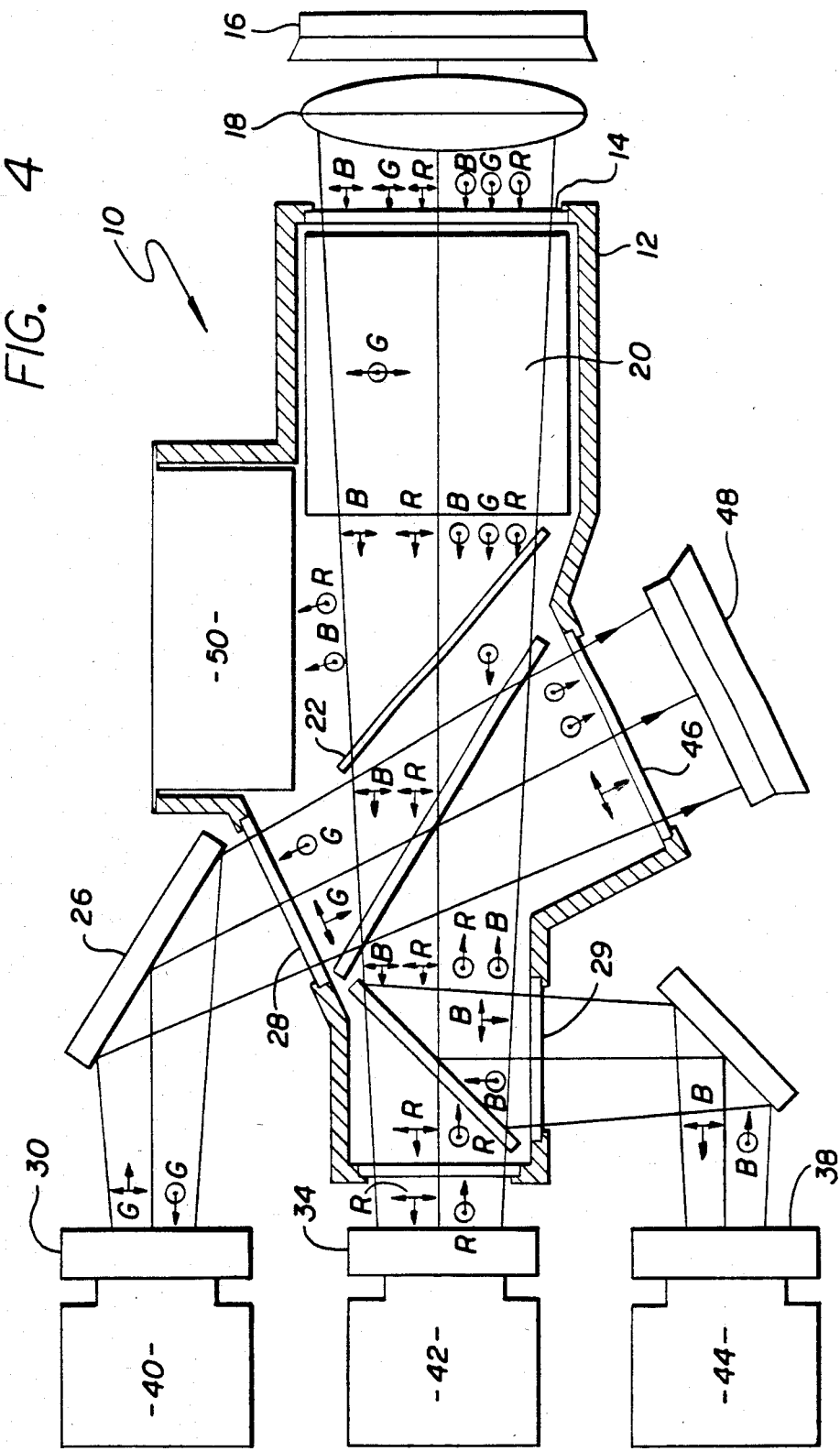
FIG. 4 shows an alternative configuration of the second embodiment of the liquid crystal light valve image projection system of the present invention.

An alternative configuration of the embodiment of FIG. 3 is shown in FIG. 4. Here again, the red and blue and the green prepolarizers 20 and 22 respectively are interchanged. In addition, the design angles of incidence for the red and blue prepolarizer 20 and the green prepolarizer 22 are changed from 45 degrees to 48.6 degrees and the design angle of incidence of the main beamsplitter 24 is changed from 45 degrees to 58 degrees. This configuration, thus provides improved green channel contrast, due to the interchange of the orientations of the prepolarizers 20 and 22, improved red and blue and green contrast by virtue of the easing of design requirements due to the larger incident angle on the red and blue prepolarizer 20 and the green prepolarizer 22, and improved system contrast due to the larger design angle for the main beamsplitter 24. While the overall tank length may be increased by the placement of the green prepolarizer 22 in front of the red and blue prepolarizer 20 and by the use of larger angles for the prepolarizers 20 and 22 and the main beamsplitter 24, the geometry of the tank is improved by the external placement of the fold mirrors 26 and 36. In this embodiment, three separate windows are required (one for each channel) with the additional exit windows 29 and 31 being provided along with a volume compensator 50. The volume compensator 50 accommodates for volume changes within the fluid as a function of temperature and may be used in the other embodiments as is known in the art. The operation of the system of FIG. 4 is essentially identical to that of the system of FIG. 3. It is anticipated that the compact design of FIG. 4 with the performance improvements associated with its configuration, will make it a preferred embodiment for many applications.

FIGS. 5a, b, c, and d show illustrative transmission curves for the green prepolarizer 22, the red and blue prepolarizer 20, the main beamsplitter (broadband polarizer/analyzer 24, and the red-blue color separator 32.

Thus, the present invention has been described with reference to particular embodiments for an illustrative application. Those of ordinary skill in the art will recognize additional modifications, applications, and embodiments within the scope of the invention. For example, the invention is not limited to the configurations shown. In fact, the illustrated configurations demonstrate that numerous configurations are possible within the teachings of the invention. Those of ordinary skill in the art will recognize that other combinations of filter designs may be used without departing from the scope of the invention.

It is intended by the appended claims to cover any and all such modifications, applications and embodiments.

Accordingly, what is claimed is:

1. An optical system for a full color liquid crystal light valve image projector comprising:
   a first prepolarizer for separating from a first beam light of first and second colors and a first polarization state;
   a second prepolarizer for separating from said first beam light of a third color and a second polarization state so that the first beam contains light of a third color and first polarization state and light of first and second colors and second polarization state;
   a polarization selective beamsplitter for transmitting, in a second beam, light in said first beam having said first polarization state and reflecting, in a third beam, light in said first beam having said second polarization state; and
   a color sensitive beamsplitter for transmitting, in a fourth beam, light in said third beam having a first color and for reflecting, in a fifth beam, light in said third beam having a second color.

2. The optical system of claim 1 including first and second reflective surfaces for reflecting said second and fifth beams respectively into a parallel coplanar relation with said fourth beam.

3. The optical system of claim 2 wherein said first prepolarizer is mounted in an optical orientation which is normal to that of said second prepolarizer, said polarization selective beamsplitter and said color selective beamsplitter.

4. An optical system for a full color liquid crystal light valve image projector comprising:
   a first prepolarizer for separating from a first beam light of a first color and a first polarization state;

a second prepolarizer for separating from said first beam light of second and third colors and a second polarization state so that the first beam contains light of a first color and second polarization state and light of second and third colors and first polarization state;

a polarization selective beamsplitter for transmitting, in a second beam, light in said first beam having said first polarization state and reflecting, in a third beam, light in said first beam having said second polarization state; and a color sensitive beamsplitter for transmitting, in a fourth beam, light in said second beam having said second color and for reflecting, in a fifth beam, light in said second beam having said third color.

5. The optical system of claim 4 including first and second reflective surfaces for reflecting said third and fifth beams respectively into a parallel coplanar relation with said fourth beam.

6. The optical system of claim 5 wherein said first prepolarizer is mounted in an optical orientation which is normal to that of said second prepolarizer, said polarization selective beamsplitter and said color selective beamsplitter.

7. A full color liquid crystal light valve image projection system comprising:

means for providing an incident beam of unpolarized white light;

a unitary optical arrangement comprising:

a first prepolarizer for separating from a first beam light of first and second colors and a first polarization state;

a second prepolarizer for separating from said first beam light of a third color and a second polarization state so that the first beam contains light of a third color and first polarization state and light of first and second colors and second polarization state;

a polarization selective beamsplitter for transmitting, in a second beam, light in said first beam having said first polarization state and reflecting, in a third beam, light in said first beam having said second polarization state;

a color selective beamsplitter for transmitting, in a fourth beam, light in said third beam having a first color and for reflecting, in a fifth beam, light in said third beam having a second color;

first and second reflective surfaces for reflecting said second and fifth beams respectively into a parallel coplanar relation with said fourth beam;

first, second and third parallel, coplanar liquid crystal light valves for modulating the polarization states of said fourth, fifth, and second beams respectively and for reflecting said polarization modulated fourth, fifth and second beams to said polarization selective beamsplitter for recombination into a single output beam; and a projection lense for displaying images contained in said output beam.

8. The full color liquid crystal light valve image projection system of claim 7 wherein said first prepolarizer is mounted in an optical orientation which is normal to that of said prepolarizer, said polarization selective beamsplitter and said color selective beamsplitter.

9. A full color liquid crystal light valve image projection system comprising:

means for providing an incident beam of unpolarized white light;

a unitary optical arrangement comprising:

a first prepolarizer for separating from a first beam light of a first color and a first polarization state;

a second prepolarizer for separating from said first beam light of second and third colors and a second polarization state so that the first beam contains light of a first color and second polarization state and light of second and third colors and first polarization state;

a polarization selective beamsplitter for transmitting, in a second beam, light in said first beam having said first polarization state and reflecting, in a third beam, light in said first beam having said second polarization state;

a color selective beamsplitter for transmitting, in a fourth beam, light in said second beam having said second color and for reflecting, in a fifth beam, light in said second beam having said third color;

first and second reflective surfaces for reflecting said third and fifth beams respectively into a parallel coplanar relation with said fourth beam;

first, second and third parallel, coplanar liquid crystal light valves for modulating the polarization states of said third, fourth, and fifth beams respectively and for reflecting said polarization modulated third, fourth and fifth beams to said polarization selective beamsplitter for recombination into a single output beam; and a projection lense for displaying images contained in said output beam.

10. The full color liquid crystal light valve image projection system of claim 9 wherein said first prepolarizer is mounted in an optical orientation which is normal to that of said second prepolarizer, said polarization selective beamsplitter and said color selective beamsplitter.

* * * * *